(No Model.)
W. H. SAWYER.
ELECTRIC CABLE.
No. 280,521. Patented July 3, 1883.
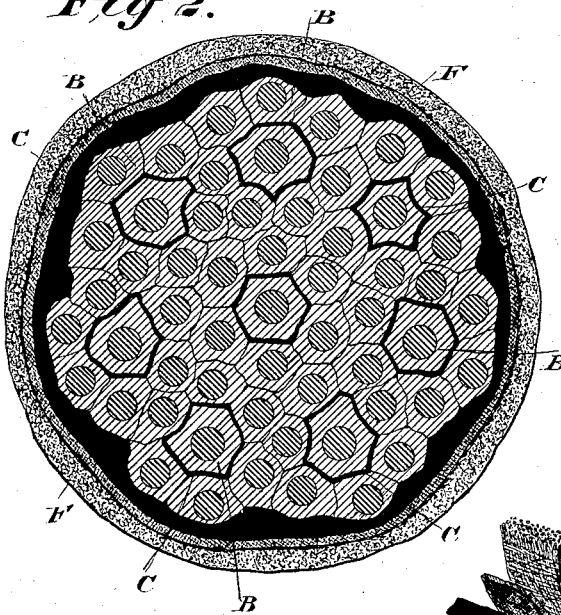
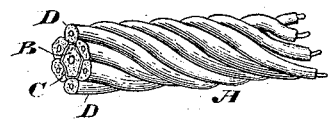
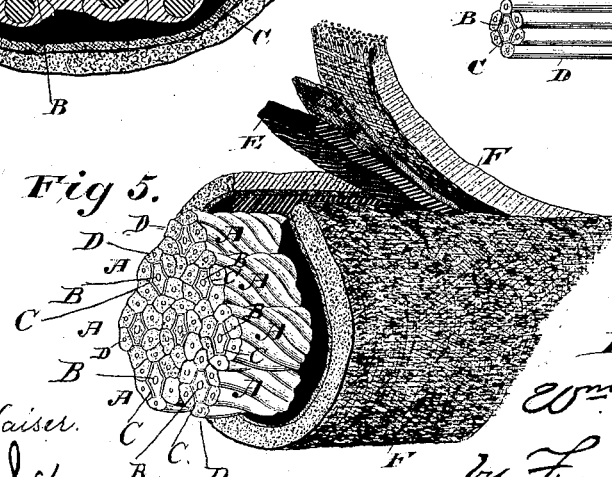
Attest
J. Henry Kaiser.
W. B. Hale.
Inventor
Wm. H. Sawyer,
by Fred. W. Royce
Attorney.

UNITED STATES PATENT OFFICE.

WILLIAM H. SAWYER, OF PROVIDENCE, RHODE ISLAND.

ELECTRIC CABLE.

SPECIFICATION forming part of Letters Patent No. 280,521, dated July 3, 1883.

Application filed May 10, 1883. (No model.)

*To all whom it may concern:*

Be it known that I, WILLIAM H. SAWYER, a citizen of the United States, residing at Providence, in the county of Providence and State of Rhode Island, have invented certain new and useful Improvements in Electric Cables, of which the following is a specification, reference being had therein to the accompanying drawings.

This invention relates to that class of electric cables which are constructed with a view to obviate inductive effect of the wires thereof upon each other.

It has heretofore been considered necessary to surround each conductor or wire with a metal sheath in order to secure practical freedom from induction, and cables constructed upon this idea have therefore been very expensive and objectionable on account of their great weight in proportion to their capacity or number of wires. Particularly is the excessive weight conspicuous in that type of anti-induction cables in which metal foil is used for wrapping each wire.

The object of my invention is to provide an electric cable in which the conductors are sufficiently protected from inductive influences to insure practical efficiency in working, while the cable as a whole is not so expensive and heavy in proportion to the number of wires as those of its general class heretofore constructed. I have found that to secure a practical "anti-induction" cable it is not necessary to completely inclose each insulated wire separately in metal, and that by so inclosing a portion of the wires and properly disposing the rest a sufficient freedom from induction is attained for all practical purposes.

My invention consists in a novel disposition of the wires of a cable in groups, each of which comprises one or more wires inclosed in metal outside of the insulation and a number of wires which are not separately inclosed in metal, the several groups being laid together either spirally or straight and the non-metal sheathed wires thus arranged in such relation to those sheathed in metal that a practically efficient interception of induction is effected.

The invention further consists in a specific construction of cable in which the insulated conductors are arranged in groups, each of which comprises a central insulated wire sheathed in metal and having a layer of wires without metal sheaths laid about it, the several groups so formed being laid together to form the cable.

In the accompanying drawings, Figure 1 is a perspective view of a portion of a cable constructed according to my invention. Fig. 2 is an enlarged cross-section of the same. Fig. 3 is a perspective view of a portion of a single group of wires laid spirally about a core wire. Fig. 4 is a similar view of a portion of a group laid straight. Fig. 5 is a perspective view of a portion of cable with part of covering turned out.

The groups of conductors are severally designated by the letter A. B indicates the central wires of the groups, and C the metal sheathings of said central wires. The surfaces of the insulation and sheathings are irregular in shape, as shown, on account of being pressed together in the cable. The outer wires, D, of each group are laid spirally about the sheathing of the central wire, and then the several groups are laid spirally together, as shown in Fig. 3. The wires and groups may, however, be laid straight instead of spirally.

The metallic sheathing of the central wire is preferably tin-foil; but I do not confine myself to any particular kind of metal for this purpose.

It will be understood that the wires of each group, when laid spirally, are necessarily out of parallelism with those of adjacent groups, both by reason of their separate spiral arrangement and the similar arrangement of the groups in a cable, while the radial inductive effect of the central wires, even when the outer wires are straight, is intercepted by their metallic sheathings, and these sheathings serve also to intercept lateral induction from the unsheathed wires and induction upon most of them from outside conductors.

The wires may be sheathed, grouped, and cabled by any of the known methods, and after the groups are laid together I usually pass the cable through a machine similar to that shown in the Patent No. 252,261, granted to me on the 10th day of January, 1882, and place upon it, first, a covering sheet india-rubber, as shown at E, and outside of this a braided covering, F, of fibrous threads or cords, which is then painted with a thick coating of waterproof paint. The covering thus formed is an efficient protection for the wires against wet weather and any usage which a cable is liable to encounter.

While I do not claim that my cable as now described is exempt from the influences of induction, it is so far free therefrom that no serious interference with its practical working is experienced, and its comparative cheapness and lightness render it available for use whenever economy and rapidity of handling are desirable, as well as efficiency.

In covering my cable the inner covering of sheet india-rubber may be vulcanized or unvulcanized, and in the latter case it may be vulcanized after being placed upon the cable.

It is my intention to make the cable-covering which I have shown in the drawings and described the subject of a separate application for patent, and therefore I make no claim to it here.

What I claim is—

1. An electric cable composed of a series of groups of insulated wires laid together, and each group comprising a central wire sheathed in metal outside of its insulation and a series of the wires without metallic sheaths laid about it, substantially as described.

2. An electric cable composed of groups of insulated wires, some of which are sheathed in metal, while others are without metallic sheaths, the several groups being laid together, substantially as described.

3. An electric cable composed of a series of groups of insulated wires and a single metal sheathing in each group, substantially as described.

4. An electric cable composed of insulated wires, a portion of which are separated from other portions by metal walls, a portion of the wires being without separate metallic sheaths, substantially as described.

In testimony whereof I affix my signature in presence of two witnesses.

WILLIAM H. SAWYER.

Witnesses:
FRANK S. MEAD,
FRED H. ANGELL.